（12）United States Patent
Sato et al.

(10) Patent No.: US 11,043,664 B2
(45) Date of Patent: Jun. 22, 2021

(54) NEGATIVE ELECTRODE FOR ALKALINE SECONDARY BATTERY, AND ALKALINE SECONDARY BATTERY

(71) Applicant: FDK CORPORATION, Tokyo (JP)

(72) Inventors: Toshiki Sato, Tokyo (JP); Jun Ishida, Tokyo (JP); Akira Saguchi, Tokyo (JP); Shota Ohata, Tokyo (JP)

(73) Assignee: FDK CORPORATION, Tokyo (JP)

( * ) Notice: Subject to any disclaimer, the term of this patent is extended or adjusted under 35 U.S.C. 154(b) by 276 days.

(21) Appl. No.: 16/383,048

(22) Filed: Apr. 12, 2019

(65) Prior Publication Data

US 2019/0319260 A1 Oct. 17, 2019

(30) Foreign Application Priority Data

Apr. 13, 2018 (JP) .............................. JP2018-077669

(51) Int. Cl.
*H01M 4/24* (2006.01)
*H01M 4/36* (2006.01)
(Continued)

(52) U.S. Cl.
CPC ........... *H01M 4/242* (2013.01); *H01M 4/366* (2013.01); *H01M 4/383* (2013.01); *H01M 4/623* (2013.01);
(Continued)

(58) Field of Classification Search
CPC ...... H01M 4/242; H01M 4/366; H01M 4/383; H01M 4/623; H01M 10/286; H01M 2004/027; H01M 2300/0014
See application file for complete search history.

(56) References Cited

U.S. PATENT DOCUMENTS

2012/0058375 A1  3/2012  Tanaka et al.

FOREIGN PATENT DOCUMENTS

| JP | 02-291665 A | 3/1990 |
|----|-------------|--------|
| JP | 2005158654 A | 6/2005 |
| JP | 2017183193 A | 10/2017 |

OTHER PUBLICATIONS

EPO machine generated English translation of JP 2017-183193 (Year: 2017).*

(Continued)

*Primary Examiner* — Christopher P Domone
*Assistant Examiner* — Kimberly Wyluda
(74) *Attorney, Agent, or Firm* — Kinney & Lange, P.A.

(57) ABSTRACT

A battery comprises an electrode group including a separator, a positive electrode and a negative electrode. The negative electrode comprises a negative electrode core, negative electrode mixture layers retained to the negative electrode core, and a fluorine resin layer disposed on the surface of the negative electrode mixture layers. The negative electrode mixture layers include a first outermost peripheral region located at the outermost periphery of the electrode group and a second outermost peripheral region located opposite to the first outermost peripheral region. When the amount of the fluorine resin constituting a first fluorine resin layer in a portion of the first outermost peripheral region is represented by A, and the amount of the fluorine resin constituting a second fluorine resin layer in a portion of the second outermost peripheral region is represented by B, a relation A>B is satisfied.

6 Claims, 3 Drawing Sheets

(51) Int. Cl.
*H01M 4/62* (2006.01)
*H01M 4/38* (2006.01)
*H01M 10/28* (2006.01)
*H01M 4/02* (2006.01)

(52) U.S. Cl.
CPC .... *H01M 10/286* (2013.01); *H01M 2004/027* (2013.01); *H01M 2300/0014* (2013.01)

(56) References Cited

OTHER PUBLICATIONS

Extended European Search Report dated Jul. 12, 2019, received for corresponding European Application No. 19168964.5.

* cited by examiner

NEGATIVE ELECTRODE FOR ALKALINE SECONDARY BATTERY, AND ALKALINE SECONDARY BATTERY

BACKGROUND

Technical Field

The present disclosure relates to a negative electrode for an alkaline secondary battery, and an alkaline secondary battery.

Description of the Related Art

A nickel-hydrogen secondary battery is known as one type of alkaline secondary battery. Use of the nickel-hydrogen secondary battery as a power source of various types of portable equipment is increasing. With increase in applications, further improvement in the performance of a nickel-hydrogen secondary battery is desired.

One of the performance characteristics of a nickel-hydrogen secondary battery in need of improvement relates to cycle life characteristics. In other words, improvement in cycle life characteristics is required, such that the number of charges and discharges of a battery is maximized. A number of studies, therefore, have been made to improve the cycle life characteristics of a nickel-hydrogen secondary battery. Examples of the study to improve the cycle life characteristics of a nickel-hydrogen secondary battery include the following.

In the design of a typical nickel-hydrogen secondary battery, the negative electrode capacity is larger than the positive electrode capacity, so that the oxygen gas generated from the positive electrode during overcharging is absorbed or consumed at the negative electrode. A low absorption capacity at a negative electrode, however, tends to cause increase in the internal pressure of the battery. With increase in the internal pressure of the battery, a safety valve of the battery operates to discharge an electrolyte to the outside. As a result, the electrolyte is exhausted in the battery, so that the cycle life of the battery comes to end in an early stage.

It has been proposed that the increase in the internal pressure of a battery is suppressed to extend the cycle life of the battery by providing a fluorine resin layer on the surface of the negative electrode to improve the water repellency, such that a gas absorption reaction proceeds at a rapid rate through easy contact between a hydrogen storage alloy and oxygen gas in the negative electrode (for example, refer to Japanese Patent Laid-Open No. H02-291665).

The nickel-hydrogen secondary battery is typically produced by the following method. First, when such a fluorine resin layer is provided on the surface of a negative electrode, an aqueous solution containing a fluorine resin is applied to the surface of an intermediate product of the negative electrode provided in advance. The coating is dried, so that a negative electrode having a fluorine resin layer is obtained. A positive electrode produced through a separate step is provided. The positive electrode and the negative electrode are stacked through a separator, and then wound to form an electrode group in a cylindrical shape as a whole. The electrode group is accommodated in an outer package can in a bottomed cylindrical shape. Subsequently, an alkaline electrolyte is injected into the outer package can. The open end of the outer package can is sealed with a sealing body including a positive electrode terminal. Thereby, a nickel-hydrogen secondary battery can be obtained.

The nickel-hydrogen secondary battery having an improved cycle life of the battery through suppression of increase in the internal pressure of the battery with arrangement of a fluorine resin layer on the surface of the negative electrode is desired to achieve further improvement in the production efficiency and product quality. When the electrode group is inserted into the outer package can in the production method described above, the electrode group may be caught in the middle in some cases, with the bottom of the electrode group not reaching the bottom of the outer package can in a smooth manner, which causes so-called insertion defects. In this instance, an adjustment is required in the insertion operation, resulting in the reduction in production efficiency. Further, when the electrode group is inserted into the outer package can, a negative electrode mixture at the outermost periphery of the electrode group may fall off in some cases. In this instance, due to the fallen negative electrode mixture, an internal short circuit may be caused, or a specified battery capacity may not be obtained. Such failures tend to occur in batteries with an enlarged capacity, in particular. More specifically, the amounts of the positive electrode mixture and the negative electrode mixture need to be increased for enlargement of capacity, so that the volume of the electrode group of a battery with an enlarged capacity is larger than the volume of the electrode group of a normal battery. As a result, in the case of a battery with an enlarged capacity, when the electrode group is inserted into an outer package can, the falling of the negative electrode mixture at the outermost periphery of the electrode group and the insertion defects of the electrode group tend to occur.

SUMMARY

According to the present disclosure, provided is a negative electrode for an alkaline secondary battery comprising a belt-like negative electrode core having conductivity, negative electrode mixture layers made of a negative electrode mixture supported on a first surface of the negative electrode core and a second surface opposite to the first surface, and a fluorine resin layer made of a fluorine resin disposed on a surface of the negative electrode mixture layer, the negative electrode for an alkaline secondary battery combined with a positive electrode and a separator each in a belt-like shape being wound to constitute a part of a cylindrical electrode group; wherein the negative electrode mixture layers comprise a first negative electrode mixture layer located on the first surface side and a second negative electrode mixture layer located on the second surface side; the first negative electrode mixture layer comprises a first outermost peripheral region located at the outermost periphery of the electrode group and a first inner peripheral region extending to the first outermost peripheral region; the second negative electrode mixture layer comprises a second outermost peripheral region located opposite to the first outermost peripheral region, in a range corresponding to the first outermost peripheral region, and second inner peripheral region located opposite to the first inner peripheral region, in a range corresponding to the first inner peripheral region; the first outermost peripheral region has a thickness thinner than that of each of the second outermost peripheral region, the first inner peripheral region and the second inner peripheral region; and when the amount of the fluorine resin constituting the fluorine resin layer in a portion of the first outermost peripheral region is represented by A, and the amount of the fluorine resin constituting the fluorine resin layer in a portion of the second outermost peripheral region is represented by B, a relation A>B is satisfied.

BRIEF DESCRIPTION OF THE DRAWINGS

The present disclosure will become more fully understood from the detailed description given hereinafter and the accompanying drawings which are given by way of illustration only, and thus, are not limitative of the present invention, and wherein.

DETAILED DESCRIPTION

Figure 1:
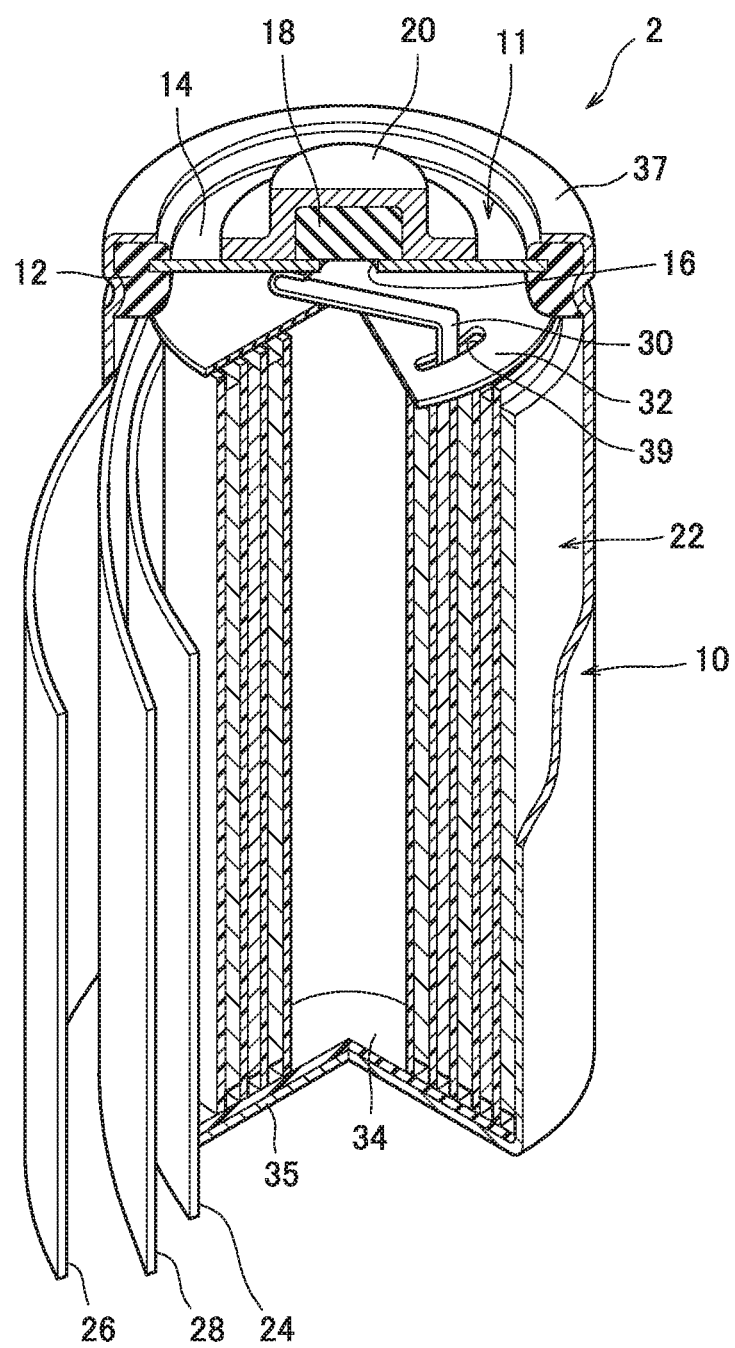
FIG. 1 is a perspective view showing a nickel-hydrogen secondary battery with partial cross sections in an embodiment of the present disclosure.

A nickel-hydrogen secondary battery 2 of the present disclosure (hereinafter referred to as battery) is described with reference to the drawing.

Examples of the battery 2 to which the present disclosure is applicable include a cylindrical AA sized battery 2 shown in FIG. 1.

As shown in FIG. 1, the battery 2 has an outer package can 10 in a bottomed cylindrical shape, with an open upper end. The outer package can 10 has conductivity and the bottom wall 35 thereof functions as a negative electrode terminal. A sealing body 11 is fixed to the opening of the outer package can 10. The outer package can 10 is sealed with the sealing body 11 including a lid plate 14 and a positive electrode terminal 20. The lid plate 14 is a conductive member in a disk shape. In the opening of the outer package can 10, the lid plate 14 and an insulating seal 12 in a ring shape surrounding the lid plate 14 are disposed. The opening edge 37 of the outer package can 10 is swaged so that the insulating seal 12 is fixed to the opening edge 37 of the outer package can 10. In other words, through cooperation of the lid plate 14 and the insulating seal 12, the opening of the outer package can 10 is hermetically closed.

The lid plate 14 has a central through hole 16 at the center. On the outer surface of the lid plate 14, a rubber valve 18 is disposed to close the central through hole 16. Further, a positive electrode terminal 20 made of metal in a cylindrical shape with a flange to cover the valve 18 is electrically connected to the outer surface of the lid plate 14. The positive electrode terminal 20 applies a pressing force to the valve 18 toward the lid plate 14. The positive electrode terminal 20 has a vent hole not shown.

In normal times, the central through hole 16 is hermetically closed with the valve 18. Meanwhile, when the pressure of gas generated in the outer package can 10 increases, the valve 18 is compressed by the pressure of gas to open the central through hole 16, so that the gas is released to the outside from the inside of the outer package can 10 through the central through hole 16 and a vent hole (not shown) of the positive electrode terminal 20. In other words, the central through hole 16, the valve 18 and the positive electrode terminal 20 constitute a safety valve for the battery 2.

An electrode group 22 is accommodated in the outer package can 10. The electrode group 22 includes a positive electrode 24, a negative electrode 26 and a separator 28 that are in a belt-like shape, respectively, and spirally wound, with the separator 28 being sandwiched between the positive electrode 24 and the negative electrode 26.

Figure 2:
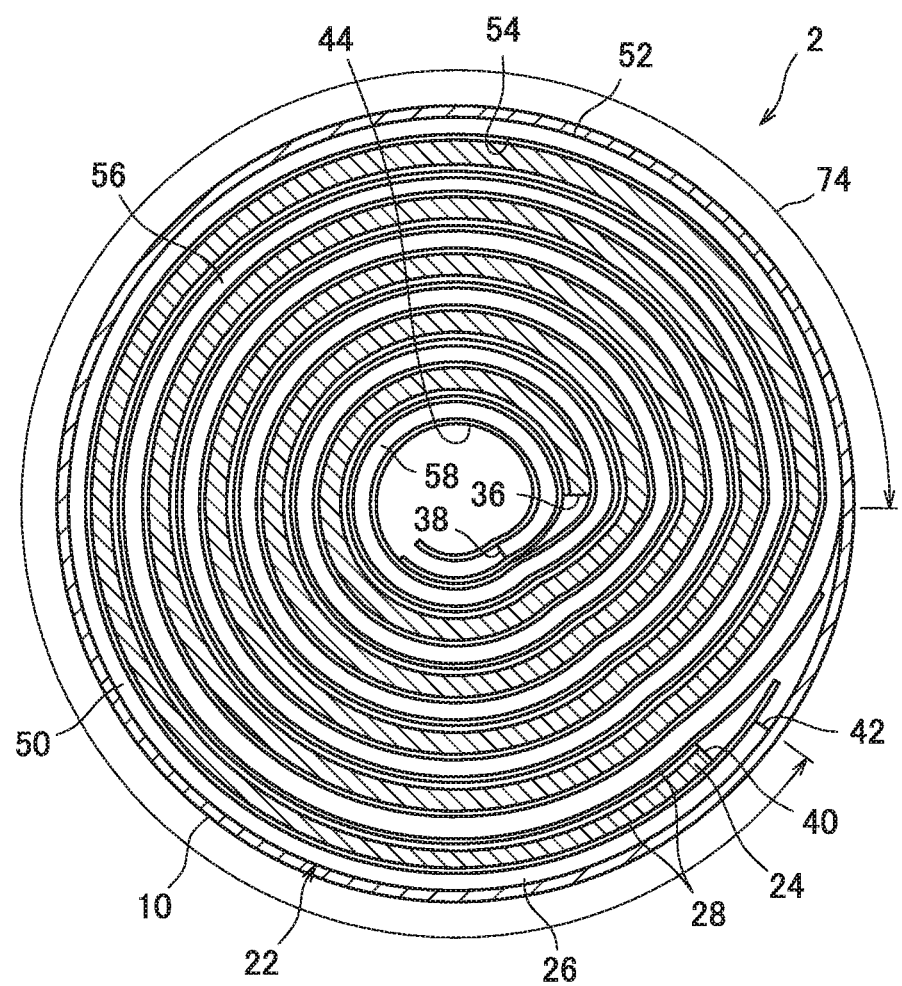
FIG. 2 is a cross-sectional view showing a transverse section of a nickel-hydrogen secondary battery in an embodiment of the present disclosure.

Specifically, with reference to FIG. 2, in the electrode group 22, the positive electrode 24 and the negative electrode 26 are alternately stacked with the separator 28 sandwiched therebetween in the radial direction of the electrode group 22.

The electrode group 22 is formed by providing the positive electrode 24, the negative electrode 26 and the separator 28 that are in a belt-like shape, respectively, and spirally winding the positive electrode 24 and the negative electrode 26 through the separator 28 around a winding core from one end side thereof. As a result, the positive electrode 24 and the negative electrode 26 have ends (starting ends of winding) 36 and 38 located at the central side of the electrode group 22, respectively, and other ends (finishing ends of winding) 40 and 42 located at the outer peripheral side of the electrode group 22, respectively. The outer periphery of the electrode group 22 is formed of the outermost periphery 50 of the negative electrode 26 without winding of the separator 28. In other words, the outside surface (outer surface) 52 in the radial direction of the electrode group 22 at the outermost periphery 50 of the negative electrode 26 is not covered with the separator 28. Also, the inside surface (inner surface) 54 in the radial direction of the electrode group at the outermost periphery 50 of the negative electrode 26 is opposed to the positive electrode 24 through the separator 28. In other words, at the outermost periphery 50 of the negative electrode 26, only the inner surface 54 is opposed to the positive electrode 24.

Further, at the negative electrode 26, an inner periphery 56 extends inward as viewed from the outermost periphery 50, and an innermost periphery 58 extends in the vicinity of the winding center of the electrode group 22, more inside the inner periphery 56.

The inner periphery 56 is a portion where both of the outer surface 52 and the inner surface 54 of the negative electrode 26 are opposed to the positive electrode 24 through the separator 28, the portion being spirally wound to extend to the vicinity of the winding center of the electrode group 22.

The innermost periphery 58 is located at the central part of the electrode group 22, and the outer surface 52 thereof is opposed to the positive electrode 24 through the separator 28. After completion of the winding of the electrode group 22 around a winding core, the winding core is removed to form a through hole 44 at the portion where the winding core has been removed.

A part of the negative electrode 26 is connected to the outer package can 10 functioning also as a negative electrode terminal though a negative electrode lead not shown. Thereby, the negative electrode 26 and the outer package can 10 are electrically connected to each other.

In the outer package can 10, a positive electrode lead 30 is disposed between a part of the electrode group 22 and the lid plate 14. Specifically, as shown in FIG. 1, one end of the positive electrode lead 30 is connected to the positive electrode 24, and another end is connected to the lid plate 14. The positive electrode terminal 20 and the positive electrode 24 are therefore electrically connected to each other through the positive electrode lead 30 and the lid plate 14. Between the lid plate 14 and the electrode group 22, an upper insulating member 32 in a circular shape is disposed, and the positive electrode lead 30 extends through a slit 39 disposed in the upper insulating member 32. Further, between the electrode group 22 and the bottom wall 35 of the outer package can 10, a lower insulating member 34 in a circular shape is disposed.

Further, the outer package can 10 contains a specific amount of alkaline electrolyte (not shown). The electrode group 22 is impregnated with the alkaline electrolyte, so that an electrochemical reaction (charge-discharge reaction) proceeds between the positive electrode 24 and the negative electrode 26 during charging and discharging. As the alkaline electrolyte, it is preferable that an aqueous solution containing at least one of KOH, NaOH and LiOH be used as solute.

Examples of the material usable as the separator 28 include a nonwoven fabric made of polyamide fiber with a hydrophilic group attached, and a nonwoven fabric made of polyolefin fiber such as polyethylene fiber and polypropylene fiber, with a hydrophilic group attached.

The positive electrode 24 includes a conductive positive electrode substrate having a porous structure, and a positive electrode mixture held in the pores of the positive electrode substrate.

Examples of the positive electrode substrate for use include a metal foam sheet plated with nickel and a nickel foam sheet.

The positive electrode mixture includes a positive electrode active material, a binder, and a conductive agent. Also, to the positive electrode mixture, positive electrode additives are added on an as needed basis.

The binder has a function to bind the positive electrode active material particles to each other and a function to bind the positive electrode active material particles to the positive electrode substrate. Examples of the binder for use include carboxymethyl cellulose, methyl cellulose, PTFE (polytetrafluoroethylene) dispersion, and HPC (hydroxypropyl cellulose) dispersion.

Examples of the conductive agent include cobalt monoxide.

Examples of the positive electrode additives include zinc oxide and cobalt hydroxide.

As the positive electrode active material particles, nickel hydroxide particles that are generally used for nickel-hydrogen secondary batteries are used. As the nickel hydroxide particles, it is preferable that high-order nickel hydroxide particles be employed.

The positive electrode active material particles described above are produced by a commonly used method for producing ones for nickel-hydrogen secondary batteries.

The positive electrode 24 may be produced, for example, by the following method.

First, a positive electrode mixture slurry containing positive electrode active material particles, water and a binder is prepared. The prepared positive electrode mixture slurry is, for example, filled in a metal foam sheet plated with nickel and dried. After drying, the metal foam sheet filled with nickel hydroxide particles and the like is rolled and then cut. Thereby, the positive electrode 24 is produced.

The negative electrode 26 is described as follows.

The negative electrode 26 comprises a conductive negative electrode core 62 in a belt-like shape, a negative electrode mixture layer 68 formed of a negative electrode mixture supported on the negative electrode core 62, and a fluorine resin layer 90 formed of a fluorine resin 85 disposed on the surface of the negative electrode mixture layer 68, having a belt-like shape as a whole. The fluorine resin layer 90 is formed by disposing the fluorine resin 85 on at least a part of the surface of the negative electrode mixture layer 68.

The negative electrode core 62 is a belt-like metal member having many through holes, which may be, for example, a punching metal sheet.

The negative electrode mixture is not only filled into the through holes of the negative electrode core 62, but also supported in a layered state on a first surface 64 and a second surface 66 of the negative electrode core 62, so as to form negative electrode mixture layers 68.

The negative electrode mixture comprises a hydrogen storage alloy particle capable of storing and releasing hydrogen as a negative electrode active material, a conductive agent, a binder and a negative electrode auxiliary.

The binder described above has a function to bind hydrogen storage alloy particles, a conductive agent and the like to each other, and a function to bind hydrogen storage alloy particles, a conductive agent and the like to the negative electrode core as well. The binder is not particularly limited, and a binder that is generally used for nickel-hydrogen secondary batteries such as a hydrophilic or hydrophobic polymer and carboxymethyl cellulose may be used.

As the negative electrode auxiliary, a styrene-butadiene rubber, sodium polyacrylate, or the like may be used.

The hydrogen storage alloy of the hydrogen storage alloy particles is not particularly limited, and it is preferable that ones that are generally used in nickel-hydrogen secondary batteries be used. It is more preferable that a hydrogen storage alloy having a composition represented by the following general formula (I) be used.

$$Ln_{1-x}Mg_xNi_{y-a-b}Al_aM_b \quad (I)$$

In the general formula (I), Ln represents at least one element selected from La, Ce, Pr, Nd, Pm, Sm, Eu, Gd, Tb, Dy, Ho, Er, Tm, Yb, Lu, Sc, Y, Ti and Zr; M represents at least one element selected from V, Nb, Ta, Cr, Mo, Mn, Fe, Co, Ga, Zn, Sn, In, Cu, Si, P and B; and subscripts a, b, x and y satisfy relations represented by $0.05 \leq a \leq 0.30$, $0 \leq b \leq 0.50$, $0 \leq x < 0.05$ and $2.8 \leq y \leq 3.9$, respectively.

The hydrogen storage alloy particles are obtained, for example, by the following method.

First, metal raw materials are weighed and mixed to have a specified composition. The mixture is melted, for example, in a high-frequency induction melting furnace and then cooled to make an ingot. The resulting ingot is subjected to heat treatment under an inert gas atmosphere at 900 to 1200° C. for 5 to 24 hours. The ingot is then pulverized and sieved into particles of the hydrogen storage alloy having a desired particle size.

Although the particle size of the hydrogen storage alloy particles is not particularly limited, it is preferable that particles having an average particle size of 55.0 to 80.0 μm be used. The average particle size refers to a volume average particle size (MV) obtained by laser diffraction/scattering using a particle size distribution analyzer.

As the conductive agent, a conductive agent that is generally used for a negative electrode of a nickel-hydrogen secondary battery is used. For example, carbon black and the like is used.

The fluorine resin 85 constituting the fluorine resin layer 90 imparts water-repellency to the negative electrode mixture layer 68 at the negative electrode 26. The fluorine resin 85 contributes to reduce the contact area between the alkaline electrolyte and the surface of the hydrogen storage alloy. Thereby, the oxygen gas generated at the positive electrode 24 during overcharging easily comes into contact with the hydrogen storage alloy so as to be easily absorbed into the hydrogen storage alloy. As a result, increase in the internal pressure of the battery 2 can be suppressed, so that the release of the alkaline electrolyte to the outside of the battery 2 through operation of the safety valve is inhibited. As a result, the cycle life characteristics of the battery 2 are improved.

Preferred examples of the fluorine resin 85 for use include polytetrafluoroethylene (hereinafter, referred to as PTFE), a tetrafluoroethylene-hexafluoropropylene copolymer (hereinafter, referred to as FEP) and perfluoroalkoxyalkane (hereinafter, referred to as PFA).

Figure 3:
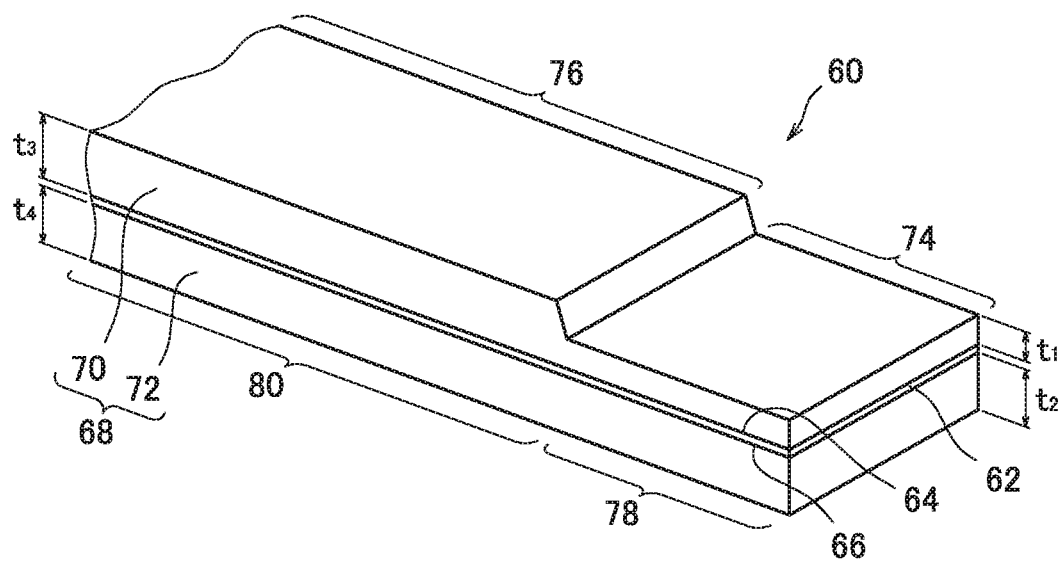
FIG. 3 is a perspective view showing the structure of an intermediate product of a negative electrode in an embodiment of the present disclosure.

The shape of an intermediate product 60 of the negative electrode before formation of the fluorine resin layer 90 is described as follows with reference to FIG. 3. In FIG. 3, the thickness of the negative electrode mixture layer 68 and the like are drawn with exaggeration for easy understanding of the structure of the intermediate product 60. Also, in FIG. 3, the portion corresponding to the innermost periphery 58 of the electrode group 22 is omitted in the drawing.

The intermediate product 60 of the negative electrode has a belt-like shape, and comprises a negative electrode core 62, and negative electrode mixture layers 68 formed of a negative electrode mixture supported on a first surface 64 of the negative electrode core 62 and on a second surface 66 opposed to the first surface 64, as shown in FIG. 3. The first surface 64 is located on the outer surface 52 side of the negative electrode 26 and the second surface 66 is located on the inner surface 54 side of the negative electrode 26.

The negative electrode mixture layers 68 comprise a first negative electrode mixture layer 70 located on the first surface 64 side and a second negative electrode mixture layer 72 located on the second surface 66 side.

The first negative electrode mixture layer 70 comprises a first outermost peripheral region 74 located at a position corresponding to the outermost periphery 50 of the negative electrode 26, and a first inner peripheral region 76 extending to the first outermost peripheral region 74.

The second negative electrode mixture layer 72 comprises a second outermost peripheral region 78 located opposite to the first outermost peripheral region 74, in a range corresponding to the first outermost peripheral region 74, and a second inner peripheral region 80 located opposite to the first inner peripheral region 76, in a range corresponding to the first inner peripheral region 76.

The first outermost peripheral region 74 has a thickness t1 that is thinner than thicknesses t2, t3 and t4 of other portions, i.e., the second outermost peripheral region 78, the first inner peripheral region 76 and the second inner peripheral region 80, respectively. It is preferable that the thickness t2, t3 and t4 each have the same dimensions.

It is preferable that the amount of the negative electrode mixture per unit area at the outermost periphery 50 of the negative electrode 26 be set in the range of 50% or more and 80% or less of the amount of the negative electrode mixture per unit area at the inner periphery 56 of the negative electrode 26.

The outermost periphery 50 of the negative electrode 26 is a portion opposed to the inner peripheral wall of the outer package can 10, and a portion not opposed to the positive electrode 24 as well (refer to FIG. 2). The outermost periphery 50 of the negative electrode 26 therefore does not contribute to the battery reaction very much, so that the negative electrode mixture is in less amount compared with other portions and formed at a less thickness compared with other portions.

Figure 4:
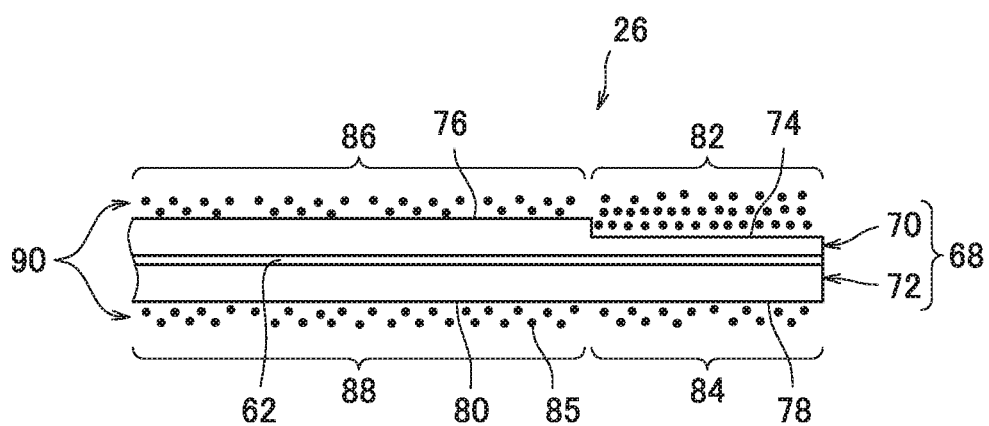
FIG. 4 is a side view showing the structure of a negative electrode in an embodiment of the present disclosure.

In the present disclosure, as shown in FIG. 4, a first fluorine resin layer 82 is formed in a portion of the first outermost peripheral region 74, a second fluorine resin layer 84 is formed in a portion of the second outermost peripheral region 78, a third fluorine resin layer 86 is formed in a portion of the first inner peripheral region 76, and a fourth fluorine resin layer 88 is formed in a portion of the second inner peripheral region 80. In FIG. 4, the thickness of the negative electrode mixture layer 68 and the like are drawn with exaggeration for easy understanding of the structure of the negative electrode 26.

When the amount of the fluorine resin 85 constituting the first fluorine resin layer 82 in a portion of the first outermost peripheral region 74 is represented by A, and the amount of the fluorine resin 85 constituting the second fluorine resin layer 84 in the second outermost peripheral region 78 is represented by B, the fluorine resin layer is formed to satisfy a relation A>B. It is preferable that the A is set 3 times or more and 7.5 times or less as large as the B. The reason is that, with the relation being satisfied, both of the improvement in the cycle life of the battery 2 and the improvement in the production efficiency and quality of the battery 2 can be achieved.

Also, it is preferable that the A expressed in mass per unit mass of the negative electrode mixture in the first outermost peripheral region 74 be set within the range of 14 mg/g or more and 30 mg/g or less, and the B expressed in mass per unit mass of the negative electrode mixture in the second outermost peripheral region 78 be set within the range of 4 mg/g or more and 10 mg/g or less. With A in the range, an effect for preventing falling of the negative electrode mixture at the outermost periphery 50 of the electrode group 22 and an effect for preventing insertion defects of the electrode group 22 inserted into the outer package can 10 can be obtained.

With A less than 14 mg/g, the effect for preventing falling of the negative electrode mixture is small and the slipping properties at the surface of the negative electrode 26 are reduced (increase in friction), so that when the electrode group 22 is inserted into the outer package can 10, the falling of the negative electrode mixture at the outermost periphery 50 of the electrode group 22 and the insertion defects of the electrode group 22 inserted into the outer package can 10 tend to occur easily. Meanwhile, with A more than 30 mg/g, the effect for preventing falling of the negative electrode mixture at the outermost periphery 50 of the electrode group 22 and an effect for preventing insertion defects of the electrode group 22 inserted into the outer package can 10 become saturated, and it becomes difficult to insert the electrode group 22 into the outer package can 10 due to increase in the thickness of the negative electrode 26 as well. It is therefore preferable that A be set within the range.

With B less than 4 mg/g, it is difficult to sufficiently reduce the contact area between the alkaline electrolyte and the surface of the hydrogen storage alloy, so that the effect for preventing the increase in the internal pressure of the battery during overcharging is small. Meanwhile, with B more than 10 mg/g, due to a large amount of the fluorine resin having high water repellency present in the negative electrode 26, the permeability of the alkaline electrolyte into the negative electrode 26 is remarkably reduced, resulting in poor discharge characteristics of the battery 2. It is therefore preferable that B be set within the range.

In the third fluorine resin layer 86 formed in a portion of the first inner peripheral region 76, and in the fourth fluorine resin layer 88 formed in a portion of the second inner peripheral region 80, it is preferable that the amount of the fluorine resin 85 and the thickness of the fluorine resin be the same as in the second fluorine resin layer 84. In FIG. 4, a portion corresponding to the innermost periphery 58 of the electrode group 22 is not shown.

The negative electrode 26 may be produced, for example, by the following method.

First, a hydrogen storage alloy powder which is an aggregate of the hydrogen storage alloy particles described above, a conductive agent, a binder and water are provided. The mixture thereof is kneaded to prepare a paste of a negative electrode mixture. Subsequently, the paste thus obtained is applied to both surfaces of the negative electrode core. On this occasion, as shown in FIG. 3, the thickness of the first outermost peripheral region 74 is made thinner than the thickness of another portion, i.e., the second outermost peripheral region 78, the first inner peripheral region 76 and the second inner peripheral region 80. The paste is then subjected to drying. After drying, the negative electrode mixture supported on the negative electrode core 62 is subjected to rolling. The intermediate product 60 of a negative electrode is thus obtained.

Then, to each of the regions of the intermediate product 60 of a negative electrode, each specified amount of a fluorine resin dispersion is applied. The method for applying the fluorine resin dispersion to the intermediate product 60 of a negative electrode is not particularly limited, and an application method using, for example, a brush, a sponge roller, a doctor blade or the like is preferred.

After the application step described above, a drying step is provided to evaporate the moisture from the dispersion. As a result, as shown in FIG. 4, the fluorine resin 85 remains on the negative electrode mixture layers 68, so that the first to fourth fluorine resin layers 82, 84, 86 and 88 are formed.

In the step for applying the fluorine resin dispersion described above, it is preferable that the fluorine resin dispersion be applied to the intermediate product 60 of a negative electrode under an environment at 20° C. or more and 25° C. or less.

Further, in the drying step after the application step, it is preferable that the intermediate product 60 of a negative electrode obtained through the application step be maintained under an environment at a temperature of 40° C. or more and 80° C. or less for 5 minutes or more and 15 minutes or less so as to evaporate the moisture from the fluorine resin dispersion. With a drying temperature of less than 40° C., the evaporation of the moisture from the fluorine resin dispersion does not proceed well, so that it becomes difficult to maintain the amount of the fluorine resin at a designed value. Meanwhile, with a drying temperature of more than 80° C., deterioration of the fluorine resin and other constituent components may be caused. It is therefore preferable that the drying temperature in the drying step be set within the range described above. Also, with a retention time of less than 5 minutes in the drying step, the fluorine resin dispersion is insufficiently dried. Meanwhile, with a retention time of at least 15 minutes, drying of the dispersion is completed. It is therefore preferable that the retention time in the drying step be set within the range described above.

As described above, the negative electrode intermediate product 60 obtained through the application step and the drying step of the fluorine resin dispersion is cut into a specified shape. Thereby, the negative electrode 26 having a fluorine resin layer 90 formed on the negative electrode mixture layers 68 is obtained.

The total thickness of the negative electrode 26 for use in the present disclosure is preferably 0.100 mm or more and 0.550 mm or less. With a total thickness of less than 0.100 mm, the amount of the hydrogen storage alloy to fill one electrode plate is small, so that it is difficult to obtain a required battery capacity. Meanwhile, with a total thickness of more than 0.550 mm, the relative volume of the negative electrode increases in the constituent components of a battery, so that it becomes difficult to accommodate the electrode group 22 in the outer package can 10.

The positive electrode 24 and the negative electrode 26 thus produced are spirally wound with a separator 28 interposed therebetween, so that an electrode group 22 is formed.

The electrode group 22 thus obtained is accommodated in an outer package can 10. Subsequently, a specified amount of alkaline electrolyte is poured into the outer package can 10. Then, the outer package can 10 in which the electrode group 22 and alkaline electrolyte are accommodated is sealed with a sealing body 11 having a positive electrode terminal 20, so that a battery 2 of the present disclosure is obtained. The battery 2 thus obtained is subjected to an initial activation treatment to become available for use.

The battery 2 of the present disclosure includes a negative electrode 26 having a fluorine resin layer 90, which suppresses the increase in the internal pressure of the battery during overcharging, so that excellent cycle life characteristics can be achieved first of all. Further, the amount of the fluorine resin 85 constituting the first fluorine resin layer 82 disposed at a portion of the first outermost peripheral region 74 of the negative electrode mixture layer located at the outermost periphery 50 of the electrode group 22 is more than the amount of the fluorine resin 85 constituting the second fluorine resin layer 84 disposed at a portion of the second outermost peripheral region 78 opposite to the first outermost peripheral region 74. A larger amount of the fluorine resin 85 is disposed at the outermost periphery 50 of the electrode group 22, which is a portion in direct contact with the outer package can 10, so that the negative electrode mixture of the outermost periphery 50 is firmly retained and easily makes slippery contact with the inner peripheral wall of the outer package can 10. As a result, when the electrode group 22 is inserted into the outer package can 10, the falling of the negative electrode mixture and the insertion defects of the electrode group 22 inserted into the outer package can 10 can be prevented. The battery 2 of the present disclosure is therefore makes an excellent battery achieving both of improvement in the cycle life and improvement in the production efficiency and product quality of a battery.

EXAMPLES

1. Production of Battery

Example 1

(1) Production of Positive Electrode

A specified amount of nickel sulfate was added to a 1 N sodium hydroxide aqueous solution containing ammonium ions so as to prepare a mixed aqueous solution. While stirring the mixed aqueous solution thus obtained, a 10 N sodium hydroxide aqueous solution was gradually added to the mixed aqueous solution to cause a reaction. The pH was stabilized at 13 to 14 during the reaction. Nickel hydroxide particles (positive electrode active material particles) were thus produced.

The nickel hydroxide particles obtained were washed 3 times with pure water in an amount of 10 times the amount of the nickel hydroxide particles, and then dehydrated and dried. Thereby, a nickel hydroxide powder which is an aggregate of nickel hydroxide particles was obtained. The particle size of the obtained nickel hydroxide particles was measured using a laser diffraction/scattering particle size distribution analyzer. As a result, the nickel hydroxide particles had a volume average particle size (MV) of 8 μm.

Subsequently, to 10 parts by mass of nickel hydroxide powder thus obtained, 0.01 parts by mass of cobalt monoxide powder, 0.003 parts by mass of carboxymethyl cellulose powder, and 5 parts by mass of water were added. The mixture was kneaded to prepare a positive electrode mixture slurry.

Subsequently, a sheet-like metal foam as positive electrode substrate was filled with the positive electrode mixture slurry. As the metal foam, one having a surface density (basis weight) of about 300 g/m$^2$, a porosity of 95%, and a thickness of about 2 mm was used. The metal foam for use was a metal foam plated with nickel.

The metal foam filled with the positive electrode mixture slurry was rolled after drying of the slurry, and then cut into specified dimensions. Thereby, a positive electrode 24 for use in AA sized batteries was obtained.

(2) Production of Negative Electrode

Metal materials of La, Sm, Mg, Ni and Al each were mixed to obtain a mixture having specified molar ratios. The mixture was melted in a high-frequency induction melting furnace in an inert gas (argon gas) atmosphere to obtain a molten metal, which was cast into a mold and then cooled to room temperature to obtain an alloy ingot. The alloy ingot was heat-treated in an argon gas atmosphere at 1000° C. for 10 hours so as to be homogenized. The ingot was then mechanically pulverized under an argon gas atmosphere to obtain a rare earth-Mg—Ni hydrogen storage alloy powder. The particle size distribution of the obtained rare earth-Mg—Ni hydrogen storage alloy powder was measured using a laser diffraction/scattering particle size distribution analyzer. As a result, the volume average particle size (MV) was 65 μm.

Further, the composition of the obtained hydrogen storage alloy was analyzed using an inductively coupled plasma (ICP) emission spectroscopic analyzer. As a result, the composition of the hydrogen storage alloy was identified to be $La_{0.194}Sm_{0.776}Mg_{0.03}Ni_{3.30}Al_{0.20}$.

Subsequently, to 10 parts by mass of the obtained hydrogen storage alloy powder, 0.005 parts by mass of carboxymethyl cellulose powder, 0.05 parts by mass of carbon black powder and 2.5 parts by mass of water were added. The mixture was kneaded to prepare a negative electrode mixture paste.

The negative electrode mixture paste was applied to a first surface (front-side surface) and a second surface (rear-side surface) of a punching metal sheet as negative electrode core. The punching metal sheet is a belt made of cold rolled steel sheet (SPCC steel sheet) having many through holes with a diameter of 1 mm, the metal sheet having a thickness of 60 μm, the surface of which being plated with nickel. The through holes of the punching metal sheet were also filled with the negative electrode mixture paste.

The thickness of the negative electrode mixture paste was set at 0.14 mm in a portion to make the first outermost peripheral region 74, and at 0.25 mm in portions to make the second outermost peripheral region 78, the first inner peripheral region 76 and the second inner peripheral region 80, respectively.

Subsequently, after drying of the negative electrode mixture paste, the negative electrode mixture supported on the punching metal sheet was rolled and then cut into specified sizes. Thereby, the intermediate product 60 of a negative electrode was obtained.

Subsequently, the intermediate product 60 of a negative electrode was subjected to an application step for applying a dispersion containing PTFE as a fluorine resin with a brush under an environment at a temperature of 25° C., and then dried to evaporate the moisture from the dispersion. In the drying treatment, the intermediate product of a negative electrode was maintained under an environment at 60° C. for 15 minutes. Thereby a negative electrode 26 was obtained.

In the application step, the fluorine resin-containing dispersion in an amount specified for each of the regions was applied. The details are as follows.

With D1 representing a specified amount of dispersion for application to the first outermost peripheral region 74, a fluorine resin in an amount of 14 mg/g, expressed in mass per unit mass of the first negative electrode mixture layer 70 in the first outermost peripheral region 74, was contained in the dispersion in a specified amount D1. Thereby, after drying, a first fluorine resin layer 82 is formed of the fluorine resin in an amount of 14 mg/g, expressed in mass per unit mass of the first negative electrode mixture layer 70 in the first outermost peripheral region 74.

With D2 representing a specified amount of dispersion for application to the second outermost peripheral region 78, a fluorine resin in an amount of 4 mg/g, expressed in mass per unit mass of the second negative electrode mixture layer 72 in the second outermost peripheral region 78, was contained in the dispersion in a specified amount D2. Thereby, after drying, a second fluorine resin layer 84 is formed of the fluorine resin in an amount of 4 mg/g, expressed in mass per unit mass of the second negative electrode mixture layer 72 in the second outermost peripheral region 78.

With D3 representing a specified amount of dispersion for application to the first inner peripheral region 76, a fluorine resin in an amount of 4 mg/g, expressed in mass per unit mass of the first negative electrode mixture layer 70 in the first inner peripheral region 76, was contained in the dispersion in a specified amount D3. Thereby, after drying, a third fluorine resin layer 86 is formed of the fluorine resin in an amount of 4 mg/g, expressed in mass per unit mass of the first negative electrode mixture layer 70 in the first inner peripheral region 76.

With D4 representing a specified amount of dispersion for application to the second inner peripheral region 80, a fluorine resin in an amount of 4 mg/g, expressed in mass per unit mass of the second negative electrode mixture layer 72 in the second inner peripheral region 80, was contained in the dispersion in a specified amount D4. Thereby, after drying, a fourth fluorine resin layer 88 is formed of the fluorine resin in an amount of 4 mg/g, expressed in mass per unit mass of the second negative electrode mixture layer 72 in the second inner peripheral region 80.

In order to confirm whether the amount of the fluorine resin in the first fluorine resin layer 82 obtained from the dispersion in a specified amount D1 at the first outermost peripheral region 74 was equal to 14 mg/g, and in order to confirm whether the amount of the fluorine resin in the second fluorine resin layer 84 obtained from the dispersion in a specified amount D2 at the second outermost peripheral region 78 was equal to 4 mg/g, the following confirmation operation was performed.

First, the mass of the intermediate product 60 of a negative electrode (hereinafter, referred to as fundamental mass) was measured. Subsequently, after application of the fluorine resin dispersion in a specified amount of D1 to the first outermost peripheral region 74, the intermediate product 60 was dried in an environment at 60° C. for 15 minutes. After drying, the mass of the intermediate product 60 (hereinafter, referred to as mass after application of D1) was measured. Then, the fundamental mass was subtracted from the mass after application of D1 so as to obtain the total mass of the first fluorine resin layer 82. Then, from the total mass of the first fluorine resin layer 82 and the unit mass of the negative electrode active material of the first outermost peripheral region 74, the amount of the fluorine resin expressed in the mass per unit mass of the first negative electrode mixture layer 70 in the first outermost peripheral region 74 was calculated. As a result, it was confirmed that the amount of the fluorine resin was equal to 14 mg/g. The results are shown in Table 1.

Subsequently, after application of the fluorine resin dispersion in a specified amount D2 to the second outermost peripheral region 78, the intermediate product 60 was dried in an environment at 60° C. for 15 minutes. The mass of the intermediate product 60 after drying (hereinafter, referred to as mass after application of D2) was measured. The mass after application of D1 was subtracted from the mass after application of D2 so as to obtain the total mass of the second fluorine resin layer 84 in the second outermost peripheral region 78. Then, from the total mass of the second fluorine resin layer 84 and the unit mass of the negative electrode active material in the second outermost peripheral region 78, the amount of the fluorine resin expressed in the mass per unit mass of the second negative electrode mixture layer 72 in the second outermost peripheral region 78 was calculated. As a result, it was confirmed that the amount of the fluorine resin was equal to 4 mg/g. The results were shown in Table 1.

(3) Construction of Nickel-Hydrogen Secondary Battery

Two sheets of separators 28 are provided, and the positive electrode 24 and the negative electrode 26 thus obtained were provided. Then, the separator 28, the positive electrode 24, the separator 28, and the negative electrode 26 were stacked in this order. At an end of the separator 28 as the undermost layer, a winding core was disposed. The laminate with the negative electrode 26 disposed at the outer side was spirally wound to produce an electrode group 22. The separator 28 for use in the production of the electrode group 22 is a nonwoven fabric of sulfonated polypropylene fiber, having a thickness of 0.15 mm (basis weight: 53 g/m$^2$). The spiral electrode group 22 was accommodated in a bottomed cylindrical outer package can made of SPCC steel sheet plated with nickel (accommodation step).

Meanwhile, an aqueous solution containing KOH, NaOH and LiOH as solutes was provided as an alkaline electrolyte. The alkaline electrolyte has mass mixing ratios between KOH, NaOH and LiOH of KOH:NaOH:LiOH=11.0:2.6:1.0. The alkaline electrolyte has a normality of 8 N.

After the accommodation step, 2 g of the alkaline electrolyte provided was poured into the bottomed cylindrical outer package can 10 with the electrode group 22 accommodated therein. The opening of the outer package can 10 was then sealed with a sealing body 11, so that an AA sized battery 2 having a nominal capacity of 2000 mAh was constructed. 100 pieces of the batteries 2 were produced.

Example 2

A nickel-hydrogen secondary battery was produced in the same manner as in Example 1, except that a dispersion containing PFA instead of PTFE as a fluorine resin was used. Also, in the confirmation operation, it was confirmed that the amount of the fluorine resin in the first outermost peripheral region 74 was equal to 14 mg/g and the amount of the fluorine resin in the second outermost peripheral region 78 was equal to 4 mg/g.

Example 3

A nickel-hydrogen secondary battery was produced in the same manner as in Example 1, except that a dispersion containing PFA instead of PTFE as a fluorine resin was used and as the specified amount D1 of the dispersion, a specified amount of a fluorine resin of 30 mg/g, expressed in mass per unit mass of the first negative electrode mixture layer 70 in the first outermost peripheral region 74 was employed. Also, in the confirmation operation, it was confirmed that the amount of the fluorine resin in the first outermost peripheral region 74 was equal to 30 mg/g, and the amount of the fluorine resin in the second outermost peripheral region 78 was equal to 4 mg/g.

Example 4

A nickel-hydrogen secondary battery was produced in the same manner as in Example 1, except the following: a dispersion containing PFA instead of PTFE as a fluorine resin was used; as the specified amount D1 of the dispersion, a specified amount of the fluorine resin of 30 mg/g, expressed in mass per unit mass of the first negative electrode mixture layer 70 in the first outermost peripheral region 74 was employed; and as the specified amount D2 of the dispersion, a specified amount of the fluorine resin of 10 mg/g, expressed in mass per unit mass of the second negative electrode mixture layer 72 in the second outermost peripheral region 78 was employed. Also, in the confirmation operation, it was confirmed that the amount of the fluorine resin in the first outermost peripheral region 74 was equal to 30 mg/g, and the amount of the fluorine resin in the second outermost peripheral region 78 was equal to 10 mg/g.

Comparative Example 1

A nickel-hydrogen secondary battery was produced in the same manner as in Example 1, except that a dispersion containing PFA instead of PTFE as a fluorine resin was used, and as specified amount D1 of the dispersion, a specified amount of the fluorine resin of 4 mg/g, expressed in mass per unit mass of the first negative electrode mixture layer 70 in the first outermost peripheral region 74 was employed. Also, in the confirmation operation, it was confirmed that the amount of the fluorine resin in the first outermost peripheral region 74 was equal to 4 mg/g, and the amount of the fluorine resin in the second outermost peripheral region 78 was equal to 4 mg/g.

Comparative Example 2

A nickel-hydrogen secondary battery was produced in the same manner as in Example 1, except the following: a dispersion containing PFA instead of PTFE as a fluorine resin was used; as the specified amount D1 of the dispersion, a specified amount of the fluorine resin of 10 mg/g, expressed in mass per unit mass of the first negative electrode mixture layer 70 in the first outermost peripheral region 74 was employed; and as the specified amount D2 of the dispersion, a specified amount of the fluorine resin of 10 mg/g, expressed in mass per unit mass of the second negative electrode mixture layer 72 in the second outermost peripheral region 78 was employed. Also, in the confirmation operation, it was confirmed that the amount of the fluorine resin in the first outermost peripheral region 74 was equal to 10 mg/g, and the amount of the fluorine resin in the second outermost peripheral region 78 was equal to 10 mg/g.

2. Evaluation on Construction of Battery (1) Measurement of the Defect Ratio of Insertion into Outer Package can During insertion of the electrode group 22 into the outer package can 10 in the accommodation step in construction of a battery in Examples and Comparative Examples, any of the electrode groups 22 caught in the middle without reaching the bottom of the outer package can 10 by a single insertion action was defined as a product with insertion defect. The number of the products with insertion defect was counted to calculate the ratio of the number of the products with insertion defect relative to the total number of the batteries constructed. The calculated result expressed in percentage was defined as the defect ratio of insertion into outer package can. The results obtained are shown in Table 1. It is indicated that the production efficiency of the battery increases with decrease in the defect ratio of insertion into outer package can.

(2) Measurement of Falling Ratio of Mixture

In production of a negative electrode 26, the mass of a punching metal sheet per sheet of the negative electrode was measured in advance. Also, the mass of the negative electrode 26 completed was measured. The mass of the punching metal sheet was subtracted from the mass of the negative electrode 26 to obtain the total mass of the negative electrode mixture.

In the accommodation step in construction of the batteries in Examples and Comparative Examples, the presence of the negative electrode mixture fallen from the outermost peripheral negative electrode of the electrode group 22 during insertion of the electrode group 22 into the outer package can 10 was confirmed. When any fallen negative electrode mixture was present, the fallen negative electrode mixture was collected and the mass of the fallen negative electrode mixture was measured.

The ratio of the mass of the fallen negative electrode mixture to the total mass of the negative electrode mixture obtained as described above was calculated. The calculation results expressed in percentage was defined as falling ratio of the mixture. The average of the falling ratio of the mixture of each battery in Examples and Comparative Examples was obtained. The results are shown as the falling ration of the mixture in Table 1. It is indicated that the higher quality with the negative electrode mixture retained to the negative electrode as designed is achieved as the falling ratio of the mixture decreases.

TABLE 1

| | Type of fluorine resin | Amount of fluorine resin [mg/g] | | Defect ratio of insertion into outer package can [%] | Falling ratio of mixture [%] |
| --- | --- | --- | --- | --- | --- |
| | | First outermost peripheral region | Second outermost peripheral region | | |
| Example 1 | PTFE | 14 | 4 | 0.02 | 0.06 |
| Example 2 | PFA | 14 | 4 | 0.01 | 0.04 |
| Example 3 | PFA | 30 | 4 | 0.00 | 0.01 |
| Example 4 | PFA | 30 | 10 | 0.00 | 0.02 |
| Comparative Example 1 | PFA | 4 | 4 | 0.09 | 0.13 |
| Comparative Example 2 | PFA | 10 | 10 | 0.07 | 0.09 |

(3) Consideration

In Comparative Examples 1 and 2, where the first outermost peripheral region 74 and the second outermost peripheral region 78 have the same amount of the fluorine resin in the outermost periphery 50 of the electrode group 22, the defect ratio of insertion into outer package can is 0.07 to 0.09% and the falling ratio of the mixture is 0.09 to 0.13%.

In contrast, in aspects of Examples 1 to 4, where the amount of the fluorine resin in the first outermost peripheral region 74 in contact with the inner peripheral wall of the outer package can 10 is larger than the amount of the fluorine resin in the second outermost peripheral region 78 opposite thereto, the defect ratio of insertion into outer package can is 0.00 to 0.02% and the falling ratio of the mixture is 0.01 to 0.06%. It is therefore shown that both of the defect ratio of insertion into outer package can and the falling ratio of the mixture are improved in comparison with those in Comparative Examples 1 and 2.

It can be therefore said that the fluorine resin amount in the first outermost peripheral region 74 in contact with the inner peripheral wall of the outer package can 10 larger than the fluorine resin amount in the second outermost peripheral region 78 opposed thereto is effective to improve both of the defect ratio of insertion into outer package can and the falling ratio of the mixture. In particular, it can be said that the effect for improving the defect ratio of insertion into outer package can and the falling ratio of the mixture can be achieved with the fluorine resin amount in the first outermost peripheral region 74 three times or more than the fluorine resin amount in the second outermost peripheral region 78.

In Example 1, where the type of the fluorine resin for use is PTFE, the defect ratio of insertion into outer package can is 0.02% and the falling ratio of the mixture is 0.06%.

In contrast, in Example 2, where the type of the fluorine resin for use is PFA, the defect ratio of insertion into outer package can is 0.01% and the falling ratio of the mixture is 0.04%. It is therefore shown that both of the defect ratio of insertion into outer package can and the falling ratio of the mixture are improved in comparison with those in Example 1.

From this, it can be said that use of PFA as the type of the fluorine resin is more effective to improve both of the defect ratio of insertion into outer package can and the falling ratio of the mixture in comparison with use of PTFE.

Further, in Examples 2, 3 and 4, the difference in the fluorine resin amount between the first outermost peripheral region and the second outermost peripheral region is as follows. The difference in the fluorine resin amount in Example 2 is 10 mg/g, the difference in the fluorine resin amount in Example 3 is 26 mg/g, and the difference in the fluorine resin amount in Example 4 is 20 mg/g. In comparison of the defect ratio of insertion into outer package can and the falling ratio of the mixture in Examples 2, 3 and 4, it is shown that those in Example 3 are most excellent, those in Example 4 are excellent next to those in Example 3, and those in Example 2 are excellent next to those in Example 4.

From this, it can be said that making the difference in the fluorine resin amount between the first outermost peripheral region 74 and the second outermost peripheral region 78 as large as possible is effective for improving the defect ratio of insertion into outer package can and the falling ratio of the mixture.

The present disclosure is not limited to the embodiment and Examples described above, and various modifications may be made. For example, although a nickel-hydrogen secondary battery was described in Examples, but the aspects are not limited thereto, and the same effect can be obtained by applying the present disclosure to other alkaline secondary batteries such as a nickel-cadmium secondary battery.

Aspect of the Present Disclosure

A first aspect of the present disclosure relates to a negative electrode for an alkaline secondary battery comprising a belt-like negative electrode core having conductivity, negative electrode mixture layers made of a negative electrode mixture supported on a first surface of the negative electrode core and a second surface opposite to the first surface, and a fluorine resin layer made of a fluorine resin disposed on a surface of the negative electrode mixture layer, the negative electrode combined with a positive electrode and a separator each in a belt-like shape being wound to constitute a part of a cylindrical electrode group; wherein the negative electrode mixture layers comprise a first negative electrode mixture layer located on the first surface side and a second negative electrode mixture layer located on the second surface side; the first negative electrode mixture layer comprises a first outermost peripheral region located at the outermost periphery of the electrode group and a first inner peripheral region extending to the first outermost peripheral region; the second negative electrode mixture layer comprises a second outermost peripheral region located opposite to the first outermost peripheral region, in a range corresponding to the first outermost peripheral region, and second inner peripheral region located opposite to the first inner peripheral region, in a range corresponding to the first inner peripheral region; the first outermost peripheral region has a thickness thinner than that of each of the second outermost peripheral region, the first inner peripheral region and the second inner peripheral region, and when the amount of the fluorine resin constituting the fluorine resin layer in a portion of the first outermost peripheral region is represented by A, and the amount of the fluorine resin constituting the fluorine resin layer in a portion of the second outermost peripheral region is represented by B, a relation A>B is satisfied.

A second aspect of the present disclosure relates to the negative electrode for an alkaline secondary battery according to the first aspect of the present disclosure, wherein the A is 3 times or more than the B.

A third aspect of the present disclosure relates to the negative electrode for an alkaline secondary battery according to the first or second aspect of the present disclosure, wherein the fluorine resin is made of perfluoroalkoxyalkane.

A fourth aspect of the present disclosure relates to the negative electrode for an alkaline secondary battery according to any one of the first to third aspects of the present disclosure, wherein the negative electrode mixture comprises a hydrogen storage alloy.

A fifth aspect of the present disclosure relates to the negative electrode for an alkaline secondary battery according to any one of the first to fourth aspects of the present disclosure, wherein the A expressed in mass per unit mass of the negative electrode mixture in the first outermost peripheral region is in the range of 14 mg/g or more and 30 mg/g or less, and the B expressed in mass per unit mass of the negative electrode mixture in the second outermost peripheral region is in the range of 4 mg/g or more and 10 mg/g or less.

A sixth aspect of the present disclosure relates to an alkaline secondary battery comprising a container, and an electrode group accommodated together with an alkaline electrolyte in the container, wherein the electrode group comprises a positive electrode and a negative electrode stacked through a separator, and the negative electrode is a negative electrode for an alkaline secondary battery according to any one of the first to fifth aspects of the present disclosure described above.

The disclosure being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A negative electrode for an alkaline secondary battery comprising a belt-like negative electrode core having conductivity, negative electrode mixture layers made of a negative electrode mixture supported on a first surface of the negative electrode core and a second surface opposite to the first surface, and a fluorine resin layer made of a fluorine resin disposed on a surface of the negative electrode mixture layers, the negative electrode combined with a positive electrode and a separator each in a belt-like shape being wound to constitute a part of a cylindrical electrode group; wherein:
   the negative electrode mixture layers comprise a first negative electrode mixture layer located on a first surface side and a second negative electrode mixture layer located on a second surface side;
   the first negative electrode mixture layer comprises a first outermost peripheral region located at an outermost periphery of the electrode group and a first inner peripheral region extending to the first outermost peripheral region;
   the second negative electrode mixture layer comprises a second outermost peripheral region located opposite to the first outermost peripheral region, in a range corresponding to the first outermost peripheral region, and a second inner peripheral region located opposite to the first inner peripheral region, in a range corresponding to the first inner peripheral region; the first outermost peripheral region has a thickness thinner than that of each of the second outermost peripheral region, the first inner peripheral region and the second inner peripheral region;
   and the amount of the fluorine resin constituting the fluorine resin layer in a portion of the first outermost peripheral region is represented by A, and the amount of the fluorine resin constituting the fluorine resin layer in a portion of the second outermost peripheral region is represented by B, and a relation A>B is satisfied.

2. The negative electrode for an alkaline secondary battery according to claim 1,
   wherein the A is 3 times or more than the B.

3. The negative electrode for an alkaline secondary battery according to claim 1,
   wherein the fluorine resin is made of perfluoroalkoxyalkane.

4. The negative electrode for an alkaline secondary battery according to claim 1,
   wherein the negative electrode mixture comprises a hydrogen storage alloy.

5. The negative electrode for an alkaline secondary battery according to claim 1,
   wherein the A expressed in mass per unit mass of the negative electrode mixture in the first outermost peripheral region is in the range of 14 mg/g or more and 30 mg/g or less, and the B expressed in mass per unit mass of the negative electrode mixture in the second outermost peripheral region is in the range of 4 mg/g or more and 10 mg/g or less.

6. An alkaline secondary battery comprising a container, and an electrode group accommodated together with an alkaline electrolyte in the container, wherein
the electrode group comprises a positive electrode and a negative electrode stacked through a separator, and
the negative electrode is a negative electrode for an alkaline secondary battery according to claim 1.

\* \* \* \* \*